(12) United States Patent
Shirvani

(10) Patent No.: US 9,858,827 B2
(45) Date of Patent: Jan. 2, 2018

(54) CAPS AND METHODS OF USAGE

(71) Applicant: Courtney Shirvani, Delmar, MD (US)

(72) Inventor: Courtney Shirvani, Delmar, MD (US)

( * ) Notice: Subject to any disclaimer, the term of this patent is extended or adjusted under 35 U.S.C. 154(b) by 0 days.

(21) Appl. No.: 14/978,793

(22) Filed: Dec. 22, 2015

(65) Prior Publication Data

US 2017/0178523 A1 Jun. 22, 2017

(51) Int. Cl.
| A63H 33/08 | (2006.01) |
| G09B 1/36 | (2006.01) |
| G09B 19/00 | (2006.01) |
| G09B 19/02 | (2006.01) |

(52) U.S. Cl.
CPC ............... *G09B 1/36* (2013.01); *G09B 19/00* (2013.01); *G09B 19/02* (2013.01)

(58) Field of Classification Search
USPC ...... 434/159, 171, 172; 446/71, 73, 85, 105, 446/108, 120, 124; 401/98, 195; D19/192, 194
See application file for complete search history.

(56) References Cited

U.S. PATENT DOCUMENTS

| 1,211,356 | A | * | 1/1917 | Roetker | ............. | B43K 29/0875 |
| | | | | | | 40/122 |
| 2,201,724 | A | | 5/1940 | Gable | | |
| 2,237,883 | A | * | 4/1941 | Lipic | .................... | B43K 29/007 |
| | | | | | | 206/38 |
| 3,065,558 | A | | 11/1962 | Loewy | | |
| 3,565,443 | A | | 2/1971 | Klein | | |
| 3,846,927 | A | * | 11/1974 | Geffen | .................... | B43K 25/00 |
| | | | | | | 24/11 CT |
| 3,852,909 | A | * | 12/1974 | Viebcke | ............... | A63H 33/065 |
| | | | | | | 446/121 |

(Continued)

FOREIGN PATENT DOCUMENTS

| CN | 2341910 Y | 10/1999 |
| CN | 202557149 U | 11/2012 |

(Continued)

OTHER PUBLICATIONS

"Play-Doh Super Tools 3-pack—Confetti Maker, Ez Molder and Flip N' Snip"; link at http://www.toysrus.com/buy/dough-sand/play-doh-super-tools-set-confetti-maker-ez-molder-and-flip-n-snip-23928-13360651; retrieved Mar. 1, 2016.

(Continued)

*Primary Examiner* — Kurt Fernstrom
(74) *Attorney, Agent, or Firm* — Lincoln Square Legal Services, Inc.

(57) ABSTRACT

Caps and methods of usage thereof are provided. In certain aspects, a cap includes a block having a first and a second surface. The first surface can include a male or female connector, and the second surface can include a male or female connector configured to removably attach to a classroom instrument. The classroom instrument can be, for example, a glue stick, a highlighter, a marker, or a writing instrument. In some aspects, the cap can include a cover configured to removably couple to the block. The cover can include a first side and a second side opposite the first side. The first side can include a decorative object disposed thereon, and the second side can be configured to contact the first surface of the block when the cover is connected to the block.

20 Claims, 6 Drawing Sheets

(56) References Cited

U.S. PATENT DOCUMENTS

| | | | |
|---|---|---|---|
| 3,961,852 A * | 6/1976 | Parry | B43K 25/00 |
| | | | 401/195 |
| 4,003,144 A * | 1/1977 | Maddestra | A63F 9/0098 |
| | | | 434/403 |
| D258,911 S * | 4/1981 | Sandel | D10/62 |
| D300,833 S * | 4/1989 | McShirley | 401/195 |
| D307,600 S * | 5/1990 | Singer | D19/123 |
| 5,044,804 A | 9/1991 | Chuang | |
| D335,936 S | 5/1993 | Lou | |
| 5,306,198 A * | 4/1994 | Forman | A63F 9/0098 |
| | | | 446/116 |
| D346,619 S * | 5/1994 | Ho | 401/195 |
| D364,248 S | 11/1995 | Su | |
| 5,554,062 A * | 9/1996 | Goldsen | A63F 9/0098 |
| | | | 434/171 |
| 5,791,798 A | 8/1998 | Yu | |
| 5,927,880 A | 7/1999 | Allison et al. | |
| 5,988,915 A * | 11/1999 | Magill | B43K 29/00 |
| | | | 401/195 |
| 6,045,281 A * | 4/2000 | Bunn | B43K 29/007 |
| | | | 40/334 |
| 6,056,464 A * | 5/2000 | Cohen | B43K 23/08 |
| | | | 401/195 |
| 6,149,330 A | 11/2000 | Chuang | |
| 6,161,975 A | 12/2000 | Clarke | |
| 6,409,403 B1 | 6/2002 | Woos | |
| 6,425,703 B1 | 7/2002 | McDonnell et al. | |
| 6,688,792 B1 | 2/2004 | Reichmann et al. | |
| 6,715,950 B2 | 4/2004 | Kim | |
| 6,746,167 B2 | 6/2004 | Ahmed | |
| 7,287,923 B1 | 10/2007 | Chen | |
| 7,780,499 B1 | 8/2010 | Csaba Truckai | |
| D630,682 S * | 1/2011 | Castro | D19/116 |
| 8,257,131 B2 | 9/2012 | Truckai | |
| D713,883 S * | 9/2014 | Puglisi | D19/192 |
| D714,383 S * | 9/2014 | Andre | D19/136 |
| 2009/0145874 A1 | 6/2009 | Hite | |
| 2011/0039474 A1* | 2/2011 | Bruder | A63H 33/101 |
| | | | 446/124 |
| 2011/0236119 A1 | 9/2011 | Richer | |
| 2013/0090033 A1 | 4/2013 | Vollers et al. | |
| 2013/0195538 A1 | 8/2013 | Jones et al. | |
| 2014/0287650 A1* | 9/2014 | Owen | A63J 19/00 |
| | | | 446/73 |

FOREIGN PATENT DOCUMENTS

| | | |
|---|---|---|
| CN | 202753667 U | 2/2013 |
| CN | 202897117 U | 4/2013 |
| CN | 202935055 U | 5/2013 |
| CN | 203126287 U | 8/2013 |
| CN | 203407668 U | 1/2014 |
| CN | 203888493 U | 10/2014 |
| DE | 19705719 A1 | 8/1998 |
| EP | 1525818 B1 | 4/2005 |

OTHER PUBLICATIONS

"Play-Doh Fun Factory Deluxe Set"; link at http://www.toysrus.com/buy/dough/play-doh-fun-factory-deluxe-set-2731980; retrieved Mar. 1, 2016.

"DohVinci Deluxe Styler"; link at http://www.toysrus.com/buy/arts-crafts/dohvinci-deluxe-styler-a7190-35760806; retrieved Mar. 1, 2016.

"Play-Doh Super Tools Set—Dial 'n Stamper, Twirl 'n Twister and Squeeze 'n Popper"; link at http://www.toysrus.com/buy/dough-sand/play-doh-super-tools-set-dial-n-stamper-twirl-n-twister-and-squeeze-n-popper-23928-13360650; retrieve Mar. 1, 2016.

"Play-Doh Playset—Star Wars: The Clone Wars"; link at http://www.toysrus.com/buy/dough-sand/play-doh-playset-star-wars-the-clone-wars-24093-11535369, retrieved Mar. 1, 2016.

"Elmer's Early Learners"; link at http://elmers.com/content/images/earlylearners/gluestick_01.png; retrieved Mar. 1, 2016.

"Melissa & Doug Shape, Model and Mold; Toys & Games"; http://www.amazon.com/melissa-doug-shape-model-mold/dp/b000062spj; retrieved Mar. 1, 2016.

* cited by examiner

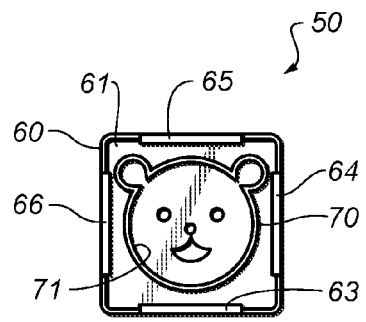
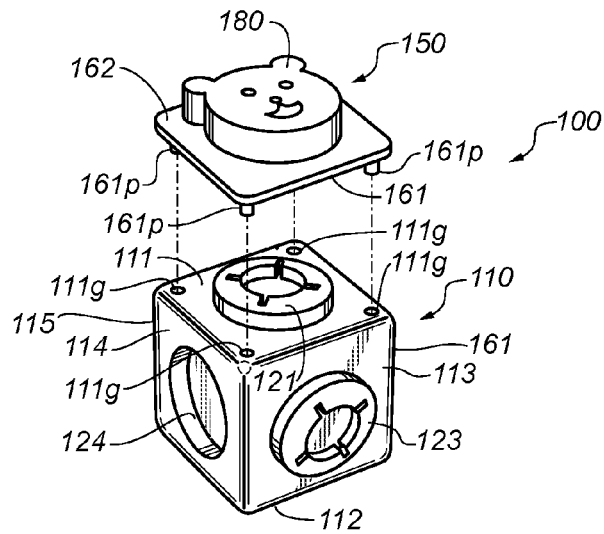
FIG. 3  FIG. 4
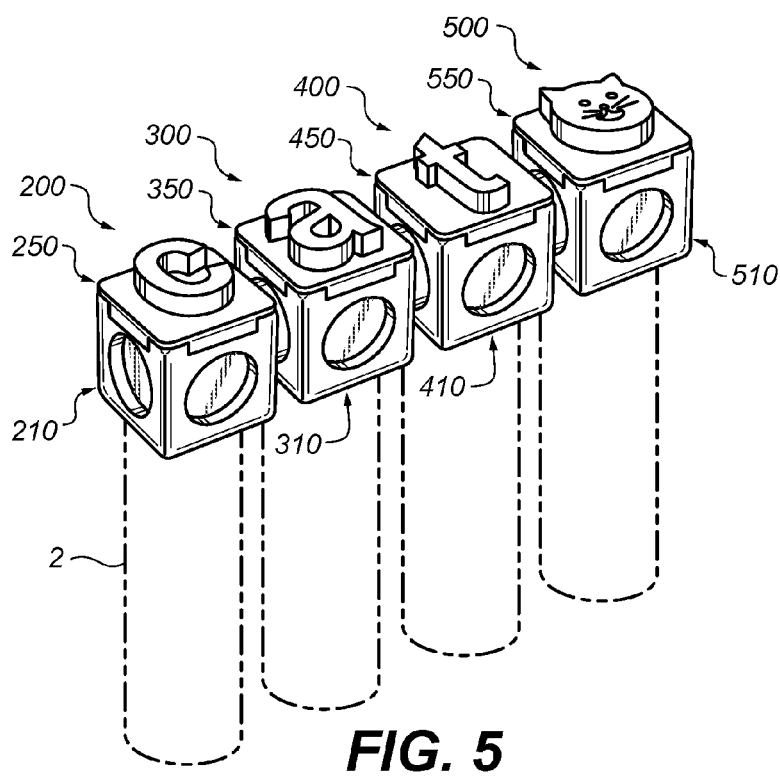
FIG. 5

US 9,858,827 B2

CAPS AND METHODS OF USAGE

FIELD OF THE TECHNOLOGY

The present technology relates to caps for objects, such as, for example, classroom instruments.

BACKGROUND OF THE TECHNOLOGY

Many classroom products (such as pens, pencils, and glue sticks) include caps. Some of these caps serve multiple purposes. For example, certain glue sticks have caps that not only to protect the glue from being exposed to the environment, but also have additional uses, such as cutting, pasting, and taping. There are also many toy products on the market designed to interact with moldable substances, such as Play-Doh®. These include blocks and stamps that feature all sorts of playful structures and shapes. None of the above-mentioned products, however, are versatile enough for use as teaching/learning aids in classrooms. More specifically, none of these products have caps that allow multiple products to interconnect with one another, which can be useful in creating educational designs, patterns, or demonstrations. Such caps can bring added-value to the classrooms and environments in which these products are often found (sometimes in multiple quantities both during and after their immediate use). There is thus an ongoing need for items that can be used multiple times

BRIEF SUMMARY

In certain embodiments, a cap configured to connect to a classroom instrument is provided. The cap can include a block having a first and a second surface. The first surface can have a male or female connector, and the second surface can have a male or female connector configured to removably attach to the classroom instrument. The cap can also include a cover configured to removably couple to the block. The cover can include a first side and a second side opposite the first side. The first side can have a decorative object disposed thereon, and the second side can be configured to contact the first surface of the block when the cover is connected to the block.

In certain embodiments, an educational system having a first cap and a second cap is provided. The first cap can be configured to connect to a respective classroom instrument, and each of the first cap and the second cap can include a plurality of surfaces. A top surface of the first cap can have a first decorative object disposed thereon, a top surface of the second cap can have a second decorative object disposed thereon, a bottom surface of the first cap can have a male or female connector configured to removably attach to the respective classroom instrument, and a side surface of the first cap can be configured to removably attach to a side surface of the second cap.

BRIEF DESCRIPTION OF THE DRAWINGS

The present technology is discussed in greater detail below with reference to exemplary embodiments illustrated in the accompanying drawings, in which:

FIG. 3 is a view of an underside of a cover of a cap, in accordance with various embodiments of the present technology;

FIG. 4 is a disassembled perspective view of a cap, in accordance with various embodiments of the present technology;

FIGS. 5, 6a, and 6b are perspective views of multiple interconnected caps, in accordance with various embodiments of the present technology.

DETAILED DESCRIPTION

Figure 1A:
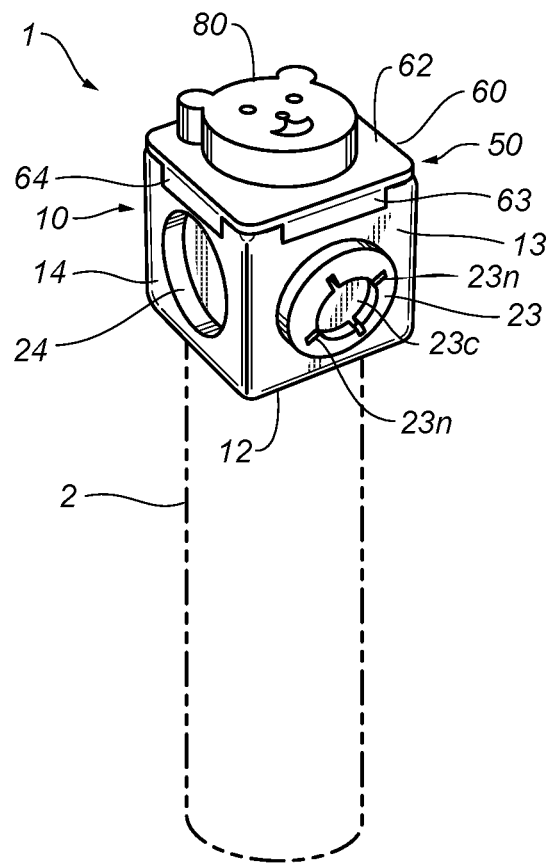
FIG. 1a is an assembled perspective view of a cap, in accordance with various embodiments of the present technology.
Figure 1B:
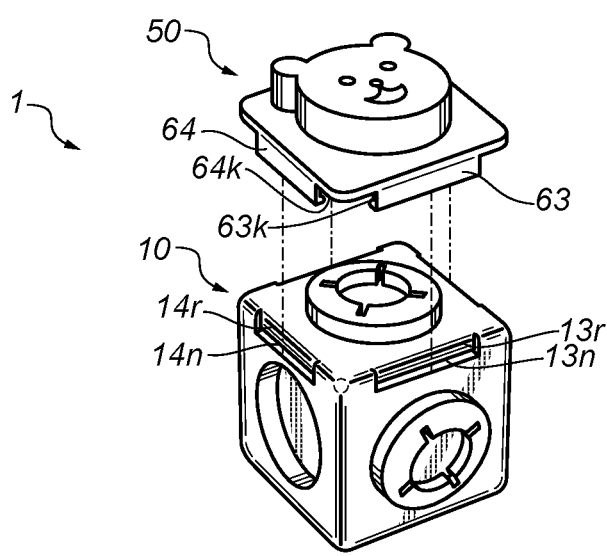
FIG. 1b is a disassembled perspective view of a cap, in accordance with various embodiments of the present technology.
Figure 2A:
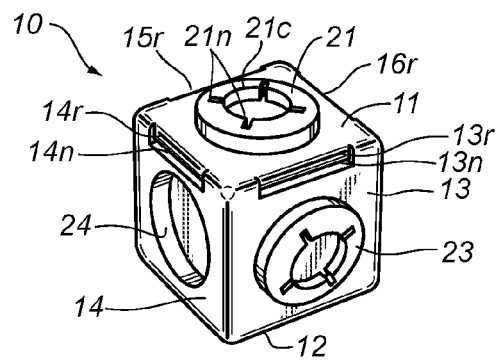
FIG. 2a is a perspective view of a block of a cap, in accordance with various embodiments of the present technology.
Figure 2B:
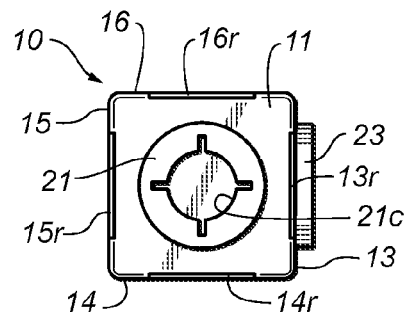
FIGS. 2b-2f are various plan views of a block, in accordance with various embodiments of the present technology.
Figure 2C:
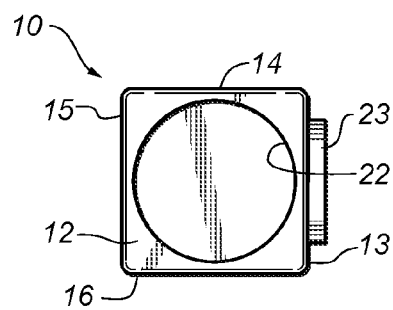
Figure 2D:
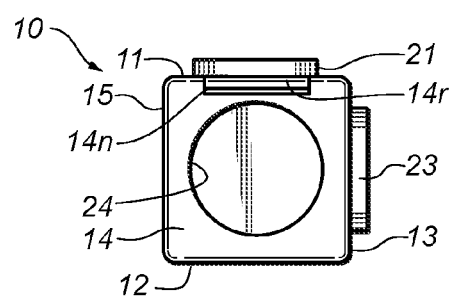
Figure 2E:
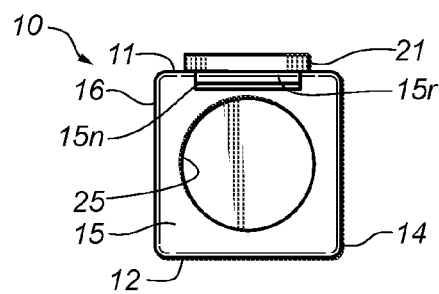
Figure 2F:
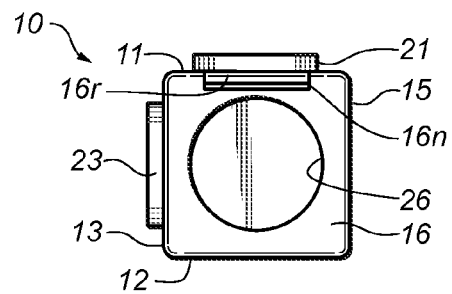

FIG. 1a is an assembled perspective view of a cap 1 for a classroom instrument 2, in accordance with various embodiments of the present technology. As used herein, "classroom instrument" refers to any item that might be used in a classroom, including but not limited to a glue stick (or any similar stick configured to apply an adhesive including, but not limited to, glue, paste or rubber cement), a pointer, an eraser, scissors, a toy, a block assembly structure, a building assembly, or a writing instrument (such as, e.g., a pen, a pencil, a highlighter, a marker, a piece of chalk, or a crayon). FIG. 1b is a disassembled perspective view of cap 1. FIG. 2a is a perspective view of a block 10 of cap 1. FIGS. 2b-2f are various plan views of block 10. FIG. 3 is a bottom view of a cover 50 of cap 1.

Referring to FIGS. 1a, 1b, and 2b-2f, in certain embodiments, block 10 can be composed of any suitable lightweight and/or durable material (e.g., polymeric material) and can be formed in any suitable manner (e.g., via 3-D printing or insert molding). In various embodiments, block 10 is a molded piece. As used herein, "molded piece" refers to any item having a design capable of giving shape to a malleable substance.

In certain embodiments, block 10 is cube-shaped and includes surfaces 11-16, of which one or more are equipped with a connector, as will be discussed further in the present disclosure. For ease of reference, in certain embodiments, surface 11 is referred to herein as the "top" surface of block 10, surface 12 is referred to herein as the "bottom" surface of the block (e.g., configured to connect to a classroom instrument, such as classroom instrument 2), and surfaces 13-16 are referred to herein as the four "side" surfaces of block 10. Other embodiments of block 10 are not limited to this, however. For example, in various embodiments, surface 11 can be the bottom surface of block 10 and surface 12 can be the top surface of block 10. In certain embodiments, one or more of surfaces 11-16 are substantially planar. In certain embodiments, the term "substantially planar" is planar or, alternatively, within about 0.05% to about 10%, about 0.1% to about 5%, or about 1% to about 2% of planar. Block 10 is not necessarily cube-shaped and is not limited to having straight surfaces. In various embodiments, block 10 can be any other shape and have straight surfaces, curved surfaces, or both.

In certain embodiments, a surface 11 has a male connector 21 (resembling, for example, a peg) that protrudes therefrom in a direction away from block 10. In certain embodiments, the height of male connector 21 is about 0.01 inch to about 0.10 inch, about 0.10 inch to about 0.5 inch, or about 0.5 inch to about 1 inch. In various embodiments, the diameter of male connector 21 is about 0.1 inch to about 0.25 inch, about 0.25 inch to about 0.5 inch, about 0.5 inch to about 1 inch, about 1 inch to about 2.5 inches, or about 2.5 inches to about 5 inches. Male connector 21 can resemble a cylindrical button, and can include a cavity 21c defined therein. Cavity 21c can have a depth that is less than or equal to the height of male connector 21, and can include a number of radially-extending notches 21n. In certain embodiments, cavity 21c is substantially circular. In certain embodiments, the term "substantially circular" is circular or, alternatively, within about 0.05% to about 2%, about 0.05% to about 5%, or about 0.05% to about 10% of circular. Cavity 21c can, in certain embodiments, be any other shape, such as, for example, a heart-shape, a star-shape, a square-shape, or the like. In other embodiments, male connector 21 can alternatively not include a cavity at all.

As shown, for example, in certain embodiments, e.g., in FIGS. 1a and 2a-2f herein, surface 12 is a bottom surface of block 10 configured to attach to classroom instrument 2. However, in other embodiments, block 10 is not so limited, and any surface thereof can be configured to connect to classroom instrument 2. Surface 12 can include a female connector 22 defined as a cylindrical cavity. Female connector 22 can have a circumference that substantially corresponds to a complementary portion of classroom instrument 2 (e.g., the glue application end of a glue stick or the writing end of a writing apparatus). In certain embodiments, female connector 22 and the complementary portion of classroom instrument 2 can have substantially similar circumferences. The terms "substantially similar" and "substantially corresponds", as used herein, are defined as identical or, alternatively, within about 0.05% to about 2%, about 0.05% to about 5%, or about 0.05% to about 10% of measured value (such as, for example, length or diameter). In various embodiments, the complementary portion couples to female connector 22 in a snug fit when surface 12 is coupled to classroom instrument 2. In various embodiments, the circumference of female connector 22 is larger than the circumference of male connector 21. In various embodiments, surface 12 alternatively includes a male connector (e.g., substantially similar to male connector 21), rather than a female connector. In these embodiments, the male connector can have a shape and/or circumference that substantially corresponds to a complementary portion of a classroom instrument (e.g., a recess at the glue application end of a glue stick). In various embodiments, the circumference of the male connector can be equal to or larger than the circumference of the complementary portion, such that the male connector couples to the complementary portion in a snug fit when surface 12 is coupled to the classroom instrument.

As with surface 11, in certain embodiments, surface 13 can include a male connector 23 that is substantially similar to male connector 21. That is, male connector 23 can have a height that is substantially similar to the height of male connector 21, and a cavity 23c (having radially-extending notches 23n) that is substantially similar to cavity 21c. In various embodiments, surfaces 11 and 13 are oriented in right-angles with respect to one another. In these embodiments, male connector 23 protrudes from surface 13 in a direction substantially orthogonal to the protrusion of male connector 21 from surface 11. In certain embodiments, the term "substantially orthogonal" is orthogonal or, alternatively, within about 0.05% to about 2%, about 0.05% to about 5%, or about 0.05% to about 10% of orthogonal.

Surfaces 14, 15, and 16 can be substantially similar to surface 12, and can include substantially similar female connectors—for example, female connectors 24, 25, and 26—each defined as a cylindrical cavity in the respective surface. In various embodiments, female connectors 24, 25, and 26 can be substantially similar to one another (e.g., with substantially similar depths and diameters). Additionally, the circumference of each of female connectors 24, 25, and 26 can be smaller than the circumference of female connector 22. The circumference of each of female connectors 24, 25, and 26 can alternatively be substantially similar to or larger than the circumference of female connector 22. In various embodiments, the circumferences of female connectors 24, 25, and 26 are smaller than the circumference of any of male connectors 21 and 23, and the depths of female connectors 24, 25, and 26 are smaller than or substantially similar to each of the heights of male connectors 21 and 23. In these embodiments, male connectors of blocks that may be substantially similar to block 10 can be coupled to any of female connectors 24, 25, and 26, for example, in a snug fit. In certain embodiments, each of the depths of female connectors 24, 25, and 26 ranges from about 0.01 inch to about 1 inch. In various embodiments, each of the diameters of female connectors 24, 25, and 26 ranges from about 0.1 inch to about 5 inches.

In certain embodiments, block 10 also includes one or more individual recesses 13r, 14r, 15r, and 16r on edges shared between surface 11 and one or more of surfaces 13, 14, 15, and 16, respectively. One or more of recesses 13r, 14r, 15r, and 16r can span a length of the corresponding edge, and can include a notch (notches 13n and 14n of recesses 13r and 14r are shown in FIGS. 1b and 2a) defined to couple to a hook portion of a latch member on cover 50 (described in more detail below).

Referring to FIGS. 1a and 3), in certain embodiments, cover 50 can include a plate 60 having an underside 61 and upper side 62, a platform 80 disposed on upper side 62, and a frame 70 disposed on underside 61. As with block 10, cover 50 can be composed of any suitable lightweight and/or durable material (e.g., polymeric material), and can be formed in any suitable manner (e.g., via 3-D printing or insert molding). In various embodiments, cover 50 is a molded piece. In some embodiments, one or more of platform 80 and frame 70 are integrally formed with plate 60 during manufacture (e.g., during 3-D printing, insert molding, or any other manufacturing process for forming cover 50).

As illustrated in FIGS. 1a and 1b, in certain embodiments, platform 80 protrudes from upper side 62 and has a decorative object with a shape that resembles, for example, the face of a teddy bear. Platform 80 can be any alternative decorative object, and can have any alternate shape, such as, for example, the shape of a letter, a pattern, a number, a design, a picture, a mathematical operator (e.g., "+", "−", "×", "/", "÷", "=", etc.), units of measurement (e.g., millimeter, centimeter, or inch marks), a punctuation mark, a keyboard character or symbol, an emoticon, or the like.

In certain embodiments, frame 70 protrudes from underside 61 in a direction opposite to, or substantially the same as, that of the protrusion of platform 80 from upper side 62. Frame 70 can conform to the shape of platform 80. A circular portion of frame 70 (e.g., the circular face of the teddy bear less the ears) can form a female connector 71 that is substantially similar to female connectors 24, 25, and 26 of block 10. Female connector 71 can have a depth and a circumference that is substantially similar to those of female connectors 24, 25, and 26. The circumference of female connector 71 can be slightly smaller than the circumference of any of male connectors 21 and 23, which allows male connector 21 to couple to female connector 71 in a snug fit.

The shape of frame 70 does not necessarily have to conform to the shape of platform 80. That is, for example, in certain embodiments, frame 70 can simply be a cylindrical cavity (e.g., female connector 71) with no additional structural features.

In certain embodiments, cover 50 can also include latch members 63, 64, 65, and 66 individually disposed on the sides of plate 60. One or more of latch members 63, 64, 65, and 66 can include a hook (hooks 63k and 64k of latch members 63 and 64 are shown in FIG. 1b). In certain embodiments, the one or more latch members can couple to one or more corresponding notches of recesses 13r, 14r, 15r, and 16r, respectively. Thus, when cover 50 is joined to block 10 in the direction shown in FIG. 1b, female connector 71 can join male connector 21, and latch members 63, 64, 65, and 66 can respectively align with recesses 13r, 14r, 15r, and 16r. Forces can then be applied to each of latch members 63, 64, 65, and 66 such that their hooks couple to the notches in recesses 13r, 14r, 15r, and 16r to further secure cover 50 to block 10. In other embodiments, no notches are included in block 10. In various embodiments, cover 50 can include one or more latches, but block 10 can include no recesses or notches. In certain embodiments, when cover 50 and block 10 are fully assembled to form cap 1, little to no excess space or gap is visible between the two components.

It is to be understood that, depending on the physical dimensions of female connector 71 and male connector 21, the connection therebetween, alone, may provide a sufficient coupling force between cover 50 and block 10. Thus, in some embodiments, no interlocking mechanisms (such as latch members and recesses) are included in the cover and the block of the cap.

In various embodiments, two or more of latch members 63, 64, 65, and 66 are substantially similar to one another, and two or more of recesses 13r, 14r, 15r, and 16r are substantially similar to one another. In these embodiments, cover 50 can be rotated, from its orientation shown in FIGS. 1a and 1b, by any multiple of about 90-degrees about its central axis (e.g., one, two, or three multiples of 90-degrees), subsequently positioned over block 10, and secured to block 10 via the latch-recess interlocking mechanisms described above. In certain embodiments, cover 50 has a shape different from that shown in FIGS. 1a, 1b, and 3. In these embodiments, cover 50 can secure to block 10 regardless of the orientation of cover 50 with respect to the orientation of block 10.

In various embodiments, one or more of latch members 63, 64, 65, and 66 can be fixed or movable. For example, one or more of latch members 63, 64, 65, and 66 can be bendable about a flexible portion thereof joining that latch member and plate 60. This allows for convenient maneuvering of the latch members over recesses 13r, 14r, 15r, and 16r during assembly of cap 1. In other embodiments, one or more of latch members 63, 64, 65, and 66 are rigid and not easily bendable.

Block 10 and cover 50 are depicted in FIGS. 1a, 1b, 2a-2f, and 3 as having rounded corners. However, block 10 and cover 50 can alternatively have sharp corners. Moreover, in various embodiments, block 10 and cover 50 can each have an alternate shape, such as, for example, a spherical shape, trapezoidal shape, a cylindrical shape, or the like.

In various embodiments, one or more of male connectors 21 and 23 are integrally formed with block 10 during manufacture (e.g., during 3-D printing, insert molding, or any other manufacturing process for forming block 10). In alternate embodiments, one or more of male connectors 21 and 23 are separate components distinct from block 10. In these embodiments, surfaces 11 and 13 of block 10 can be equipped with only female connectors substantially similar to female connectors 24, 25, and 26, and the separate male components are removably insertable therein to form male connectors 21 and 23.

The latch member and recess combination described above is only one example of an interlocking mechanism for cover 50 and block 10. There are alternate ways that cover 50 and block 10 can be removably secured to one another, including, for example, binary attachment, hook and loop fastening (e.g., Velcro®), snap on attachment, screw on, wiggle and loosen attachment, slide in attachment, rotating attachment, strap on attachment, static energy attachment, and magnetic attachment. In certain embodiments, the block and cover feature one or more pin-and-opening interlocking mechanisms for removably securing the two components together.

Although the various blocks and covers described herein can be used in conjunction with classroom instruments, in certain embodiments, the blocks, covers, and their corresponding male/female connectors can be configured to connect to other objects, such as, for example, shampoo or conditioner bottles, or the like, so as to unite these objects together. In certain embodiments, the caps can be used to mold soaps or the like into playful designs and shapes. Additionally, in various embodiments, the sizes of the blocks, covers, and corresponding connectors can vary depending on the sizes of the objects that they can connect to. As one example, the female connectors can be small enough to connect to standard school glue sticks. As another example, the female connectors can be large enough to connect to jumbo-sized glue sticks.

FIG. 4 is a disassembled perspective view of an alternate cap 100 having a block 110 and a cover 150. Block 110 can have surfaces 111, 112, 113, 114, 115, and 116, male connectors 121 and 123, and female connectors 122, 124, 125, and 126, one or more of which can be substantially similar to corresponding components of block 10. Cover 150 can have a plate 160 having surfaces 161 and 162, a platform 180 disposed on surface 162, and a frame or female connector disposed on surface 161, one or more of which can be substantially similar to corresponding components of cover 50. Rather than including recesses, such as recesses 13r, 14r, 15r, and 16r of block 10, block 110 can include openings 111g defined at the corners of surface 111. Additionally, rather than including latch members, such as latch members 63, 64, 65, and 66 of cover 50, cover 150 can include one or more pole-like pins 161p protruding from surface 161. Pins 161p and openings 111g can be arranged such that, when cover 150 is positioned over block 110 in the direction shown in FIG. 4, pins 161p respectively align with and are insertable into openings 111g. The lengths and widths of pins 161p can be smaller than or substantially similar to the depths and widths of openings 111g, which allows for a snug fit between each pin and opening combination. In various embodiments, when cap 100 is fully assembled, little to no visible excess space or gap exists between cover 150 and block 110. In other embodiments, the pins can instead be located on block 110 and the openings can instead be located on cover 150.

In certain embodiments, a series or combination of two or more caps (e.g., two or more caps substantially similar to cap 1) forms a design, pattern, or picture. In these embodiments, the covers of the caps may exhibit individual designs that form a pattern or picture when the caps are combined in a particular manner. FIG. 5 is a perspective view of interconnected caps 200, 300, 400, and 500 having blocks 210, 310, 410, and 510 and covers 250, 350, 450, and 550. The caps can be identical or substantially similar to cap 1, and one or more such caps can be individually connectable to a classroom instrument, such as classroom instrument 2. Rather than including a cover having a platform that resembles the face of a teddy bear (e.g., platform 80), caps 200, 300, 400, and 500 can include covers having respective platforms with shapes resembling, for example, the letters 'c', 'a', and 't' and the face of a cat. When the caps are interconnected as shown (e.g., via corresponding male connectors substantially similar to male connector 23 and female connectors substantially similar to female connectors 24), the word 'cat' juxtaposed to the face of cat is formed. Different caps can have different platforms resembling different shapes. In this way, numerous configurations can be formed by combining the caps, including, for example, words and/or phrases (e.g., the spelling thereof), mathematical representations or problems (e.g., addition, subtraction, multiplication, and division, such as fractions), sequences or series of pictures (e.g., in the form of 'first', 'next', and 'last'—such as a cap having a platform resembling a seed, a cap having a platform resembling a flower, and a cap having a platform resembling a fruit, all combined in that order, or such as a cap having a platform resembling spring, a cap having a platform resembling summer, a cap having a platform resembling fall, and a cap having a platform resembling winter, all combined in that order). In various embodiments, some of caps 200, 300, 400, and 500 can include respective bottom surfaces configured to connect to corresponding classroom instruments, while others of the caps do not include bottom surfaces configured to connect to classroom instruments.

Figure 6A:
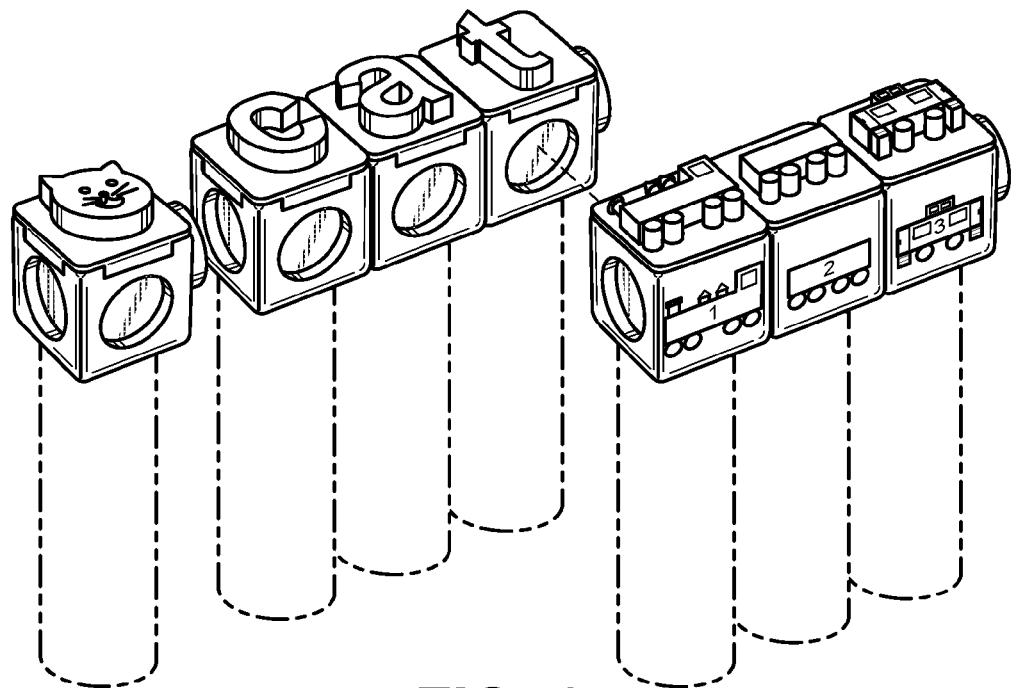
Figure 6B:
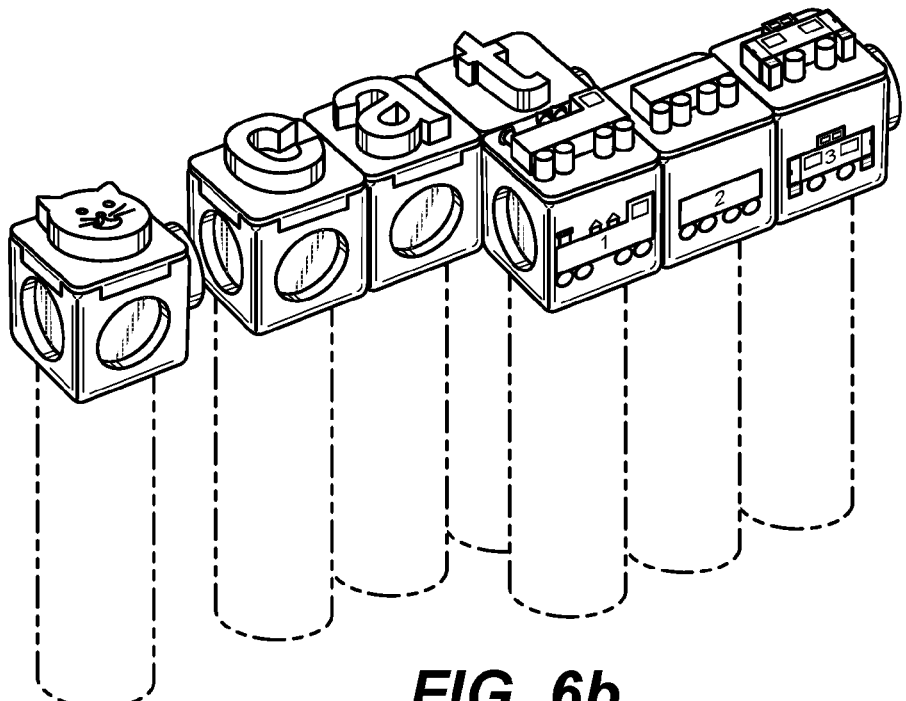

FIGS. 6a and 6b are perspective views of multiple interconnected caps. The caps can be identical to or like cap 1, and one or more such caps can be individually connectable to a classroom instrument, such as classroom instrument 2. Referring to FIG. 6a, one of the rows of caps is like those of FIG. 5. However, the order of the cover platforms (or the caps thereon) can be different—the face of a cat can be positioned to the left of the letters 'c', 'a', and 't' (the caps having the letters 'c', 'a', and 't' being interconnected, and the cap having the face of the cat being positioned to the left of the other caps and disconnected therefrom). Additionally, a second row of caps includes graphics of, e.g., train cars '1', '2', and '3' as wells covers having platforms resembling train cars. Each of one or more of the caps of FIG. 6a can be connected to classroom instrument 2. Referring to FIG. 6b, the two rows of caps can be interconnected to one another, for example, via a male connector of the cap having the '1' train graphic and a female connector of the cap having the cover with the platform resembling the letter T.

In some embodiments, a cap can include a block, but not a cover (e.g., cover 50 or cover 150). In these embodiments, the block includes a design (such as one resembling the face of a teddy bear or of a cat, or the letters 'c', 'a', or 't', as shown in FIG. 5) directly on a surface of the block (e.g., on a surface substantially similar to surface 11 of block 10). The combination of two or more of such blocks can also form a design, a pattern, a picture, short sentences, messages, sentiments, or the like.

Figure 7A:
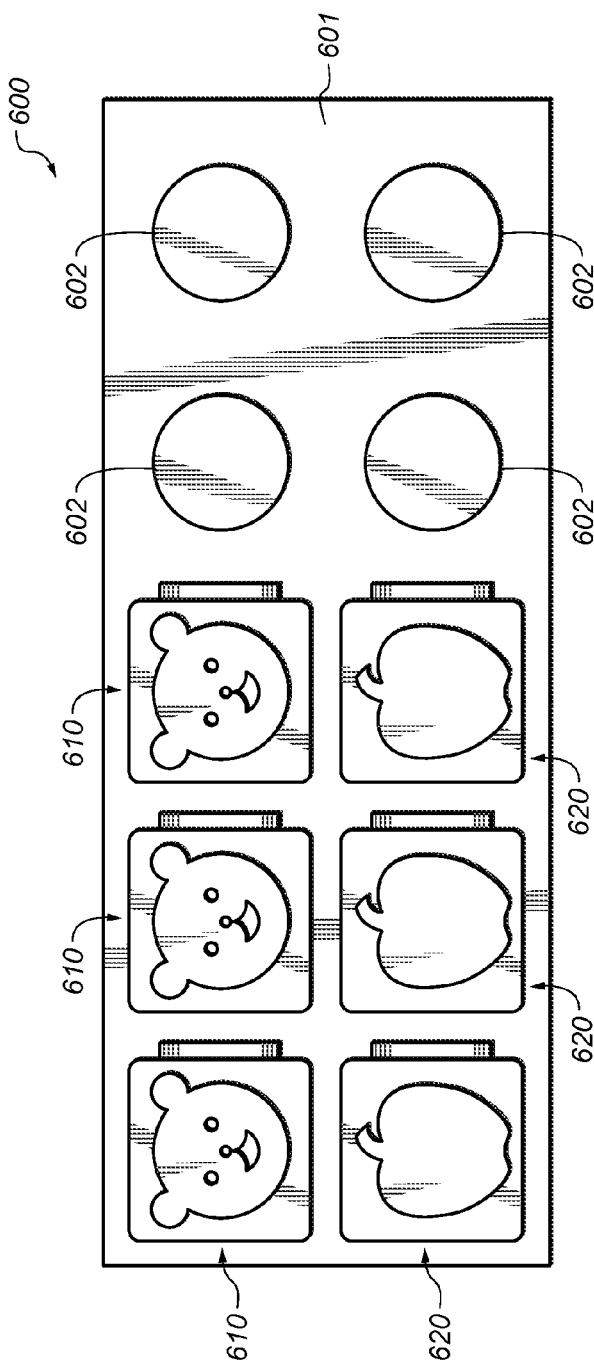
FIGS. 7a and 7b are top and side views of caps coupled to a frame, in accordance with various embodiments of the present technology.
Figure 7B:
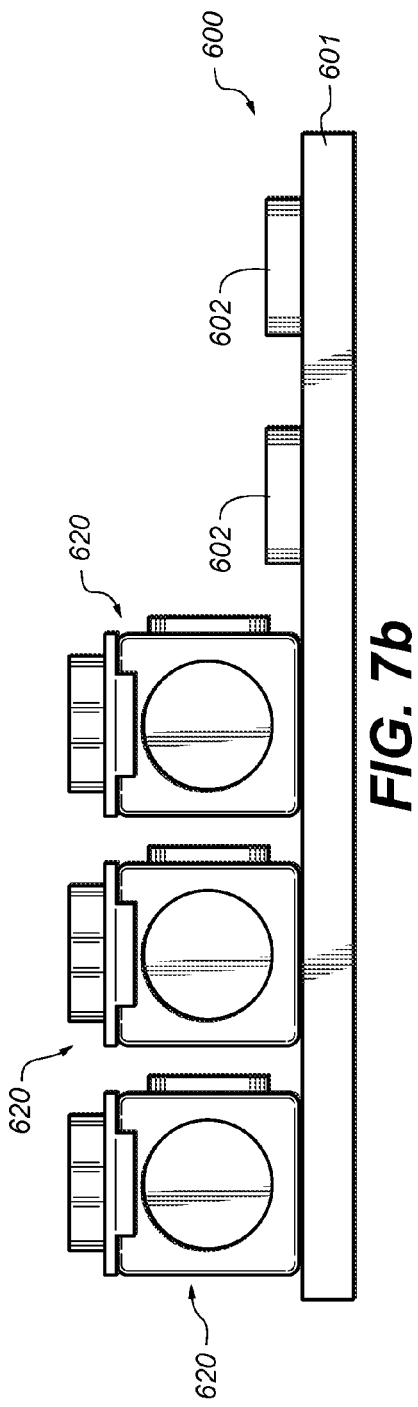

In certain embodiments, the present technology provides caps configured to couple to a frame or panel. FIGS. 7a and 7b are top and side views of multiple exemplary caps 610 and 620 that are coupled to a panel 601. In certain embodiments, caps 610 and 620 can be substantially similar to caps 1 and 100. Panel 601 can have multiple stands 602, and can be, for example, a ten-frame or other aid suitable for illustrating or solving math problems. The stands can be cylindrical and can be constructed to be substantially similar to male connectors 21 and 23 (e.g., in terms of height and diameter). As shown in FIGS. 7a and 7b, female connectors of caps 610 and 620 can be coupled to respective ones of stands 602 to, as one example, form a visually aesthetic package 600 of caps that exhibits the various designs featured on the covers of the caps. In certain embodiments, the caps can each be removed from their complementary objects (e.g., classroom instruments, shampoo bottles, or any other suitable objects), and can be independently attached or anchored to panel 601. Although panel 601 is shown to include ten stands, it can alternatively include fewer or more stands.

Figure 8:
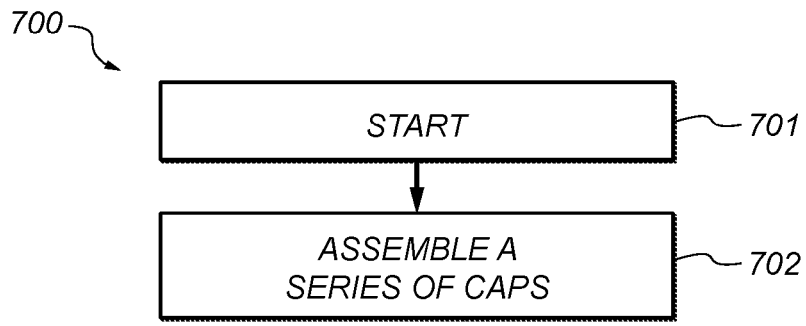
FIG. 8 shows a process for demonstrating a math problem using at least one cap, in accordance with various embodiments of the present technology.

FIG. 8 shows an exemplary process 700 for demonstrating a math problem. The process begins at step 701. At step 702, the process includes assembling a series of caps. For example, the process includes assembling one or more caps substantially similar to cap 1.

Figure 9:
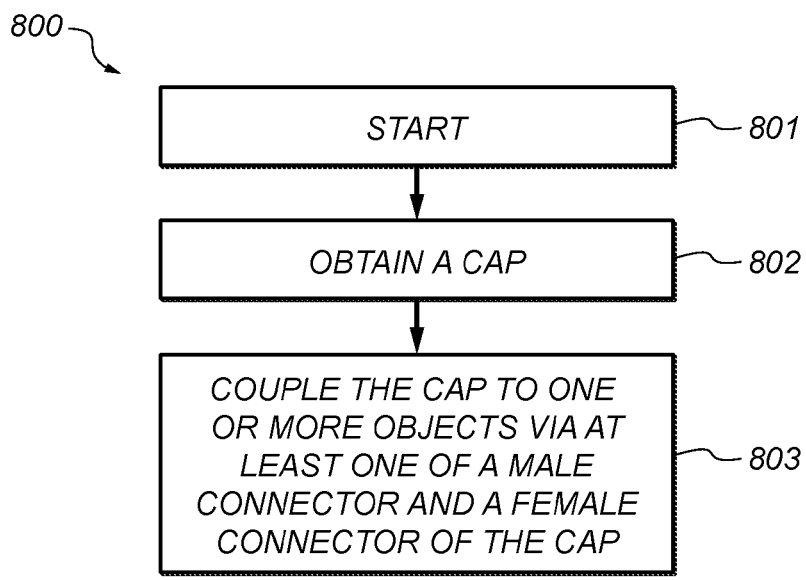
FIG. 9 shows a process for assembling a building system using at least one cap, in accordance with various embodiments of the present technology.

FIG. 9 shows an exemplary process 800 for assembling a building system. The process begins at step 801. At step 802, the process includes obtaining a cap. For example, the process can include obtaining cap 1. At step 803, the process includes coupling the cap to one or more objects via at least one of a male connector and a female connector thereof. For example, the process can include coupling cap 1 to one or more caps substantially similar to cap 1 via male connector 23 and/or at least one of female connectors 24, 25, and 26.

Figure 10:
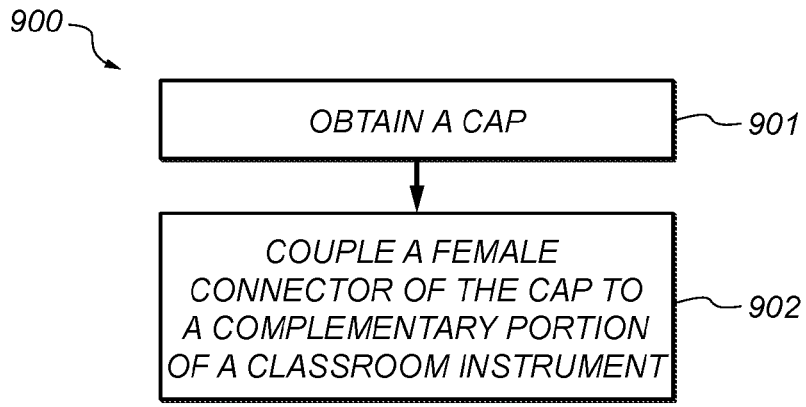
FIG. 10 shows a process for capping a classroom instrument, in accordance with various embodiments of the present technology.

FIG. 10 shows an exemplary process 900 for capping a classroom instrument. The process begins at step 901. At step 902, the process includes coupling a female connector of a cap to a complementary portion of a classroom instrument. For example, the process can include coupling female connector 22 of cap 1 to a complementary portion of classroom instrument 2.

Accordingly, the present technology provides cap embodiments that are versatile enough for use as teaching/learning aids in classrooms, and that allow multiple classroom instruments to interconnect with one another, which can be useful in creating educational designs, patterns, or demonstrations.

It will thus be seen that the aspects, features and advantages made apparent from the foregoing are efficiently attained and, since certain changes may be made without departing from the spirit and scope of the technology, it is intended that all matter contained herein shall be interpreted as illustrative and not in a limiting sense.

What is claimed is:
1. A cap configured to connect to a glue stick, the cap comprising:

a block having a first and a second surface, the first surface having a male or female connector, the second surface having a male or female connector configured to removably attach to the glue stick; and a cover configured to removably couple to the block, the cover comprising a platform that is a molded piece; and an upper side and an underside opposite the upper side, the upper side having a decorative object disposed thereon, the underside configured to contact the first surface of the block when the cover is connected to the block;

wherein the underside of the cover contacts the first surface through a binary attachment, a hook and loop fastening, a snap on attachment, a screw on, a wiggle and loosen attachment, a rotating attachment, a strap on attachment, a static energy attachment, or a magnetic attachment.

2. The cap of claim 1, wherein the first and second surfaces are on opposite or adjacent sides of the block.

3. The cap of claim 1, wherein the first surface has a male connector and the second side comprises a female connector.

4. The cap of claim 1, wherein the first surface has a female connector and the second surface comprises a male connector.

5. The cap of claim 1, wherein the block further comprises: third, fourth, fifth, and sixth surfaces, one or more of the third, fourth, fifth, and sixth surfaces having a male or female connector.

6. The cap of claim 1, wherein the decorative object is a letter, pattern, number, design, picture, mathematical operator, keyboard symbol, or mark or marks representative of a unit of measurement.

7. The cap of claim 1, wherein the classroom instrument is a glue stick, a highlighter, or a writing instrument.

8. An apparatus comprising a classroom instrument and the cap of claim 1.

9. A method of connecting caps, the method comprising removably attaching the cap according to claim 1 to a second cap according to claim 1.

10. An educational system comprising two or more caps of claim 1.

11. A method of capping a classroom instrument, the method comprising removably attaching a classroom instrument to the cap of claim 1.

12. The cap of claim 1, wherein the underside of the cover contacts the first surface through:
(a) one or more pole-like pins on the underside of the cover or on the first surface of the block, configured to connect with one or more corresponding openings on the first surface of the block or on the underside of the cover; or
(b) one or more latch members forming part of the upper side of the cover and each comprising a hook member; each hook member configured to align with a corresponding recess on an edge between the first surface of the block and a surface of the block adjacent to the first surface of the block.

13. A kit, comprising:
(a) a block or cover of claim 1; and
(b) a malleable substance.

14. The kit of claim 13, wherein the malleable substance is soap.

15. An educational system comprising a first cap and a second cap; the first cap being configured to connect to a glue stick, each of the first cap and the second cap comprising a plurality of surfaces, a top surface of the first cap having a first decorative object disposed thereon, a top surface of the second cap having a second decorative object disposed thereon, a bottom surface of the first cap having a male or female connector configured to removably attach to the glue stick, and a side surface of the first cap being configured to removably attach to a side surface of the second cap; wherein the first cap comprises:
(a) a block having a first and a second surface, the first surface having a male or female connector, the second surface having a male or female connector configured to removably attach to the classroom instrument; and
(b) a cover configured to removably couple to the block, the cover comprising a platform that is a molded piece, and an upper side and an underside opposite the upper side, the upper side having a decorative object disposed thereon, the underside configured to contact the first surface of the block when the cover is connected to the block;
wherein the underside of the cover contacts the first surface through a binary attachment, a hook and loop fastening, a snap on attachment, a screw on, a wiggle and loosen attachment, a rotating attachment, a strap on attachment, a static energy attachment, or a magnetic attachment.

16. The educational system of claim 15, wherein the side surface of the first cap comprises a male connector and the side surface of the second cap comprises a female connector.

17. The educational system of claim 15, wherein the side surface of the first cap comprises a female connector and the side surface of the second cap comprises a male connector.

18. The educational system of claim 15, wherein one or more of the first and the second decorative objects is a letter, a pattern, a number, a design, a picture, a mathematical operator, a keyboard symbol, or a mark or marks representative of a unit of measurement.

19. A method comprising the step of assembling the first and the second caps of claim 15 together.

20. The method of claim 19, wherein assembling the first and the second caps together comprises removably attaching the side surface of the first cap to the side surface of the second cap.

\* \* \* \* \*